(Model.)
W. J. BAKER.
BOX FASTENER.
No. 264,605. Patented Sept. 19, 1882.
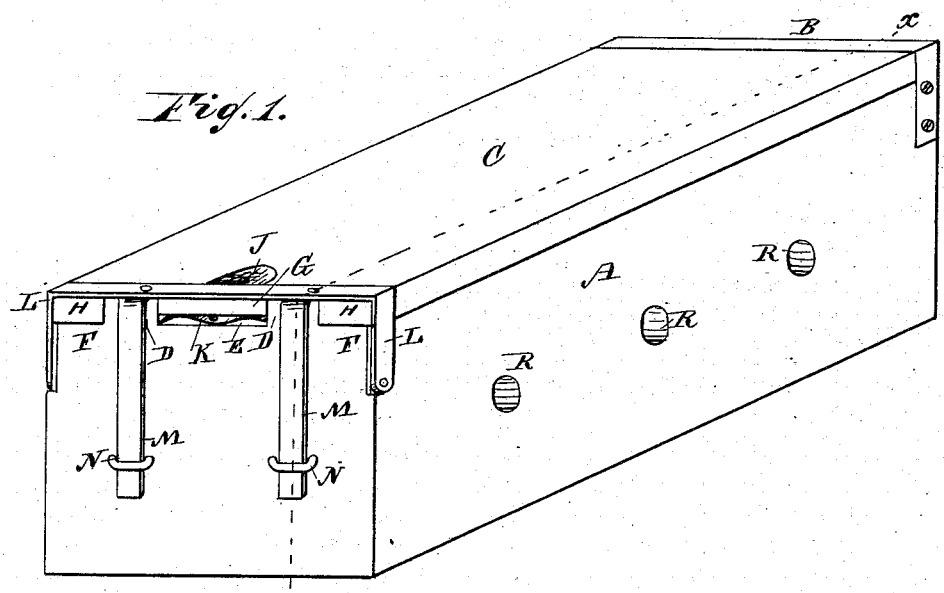
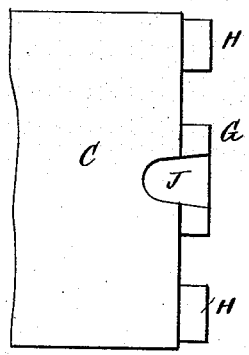
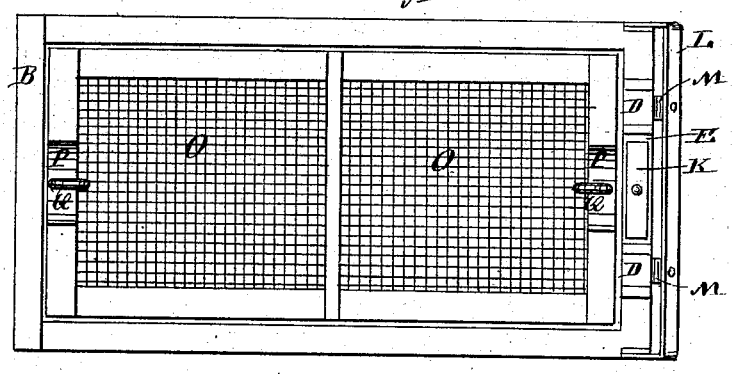
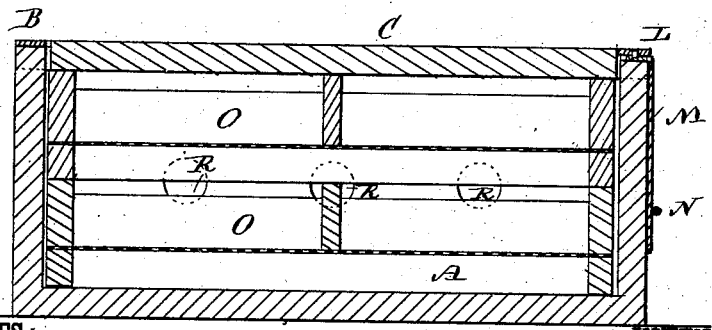
WITNESSES:
Theo. G. Hoster
C. Sedgwick
INVENTOR:
W. J. Baker
BY Munn & Co.
ATTORNEYS.

UNITED STATES PATENT OFFICE.

WILLIAM J. BAKER, OF DENVER, COLORADO.

BOX-FASTENER.

SPECIFICATION forming part of Letters Patent No. 264,605, dated September 19, 1882.

Application filed April 19, 1882. (Model.)

To all whom it may concern:

Be it known that I, WILLIAM J. BAKER, of Denver, in the county of Arapahoe and State of Colorado, have invented a new and Improved Lid-Fastener, of which the following is a full, clear, and exact description.

The object of my invention is to facilitate the fastening of lids on boxes without the use of screws or nails, and in such a manner that the lid can be fastened or removed very easily and rapidly.

The invention consists in a lid-fastening formed of a pivoted bail at one end of the box, to which bail downwardly-projecting springs are attached, which pass through staples on the end of the box, which springs press the bail over the end of the lid, which is provided with a series of tongues fitting into recesses and between tongues on the upper edge of the end of the box, which end of the box is provided on its upper edge with a spring, which presses upward and presses the lid up against the pivoted bail to prevent loosening of the bail, as will be fully described hereinafter.

Reference is to be had to the accompanying drawings, forming part of this specification, in which similar letters of reference indicate corresponding parts in all the figures.

Figure 1 is a plan view of a box provided with my improved lid-fastener. Fig. 2 is a plan view of the same, showing the lid removed. Fig. 3 is a plan view of that end of the lid which is held by the pivoted bail. Fig. 4 is a longitudinal sectional elevation of the box on the line x x, Fig. 1.

The box A is provided at one end with a strap or band, B, extending transversely over the top of the box at the end of the same and a short distance above this end of the box, so that one end of the lid C can be passed under this strap, as shown. The opposite end of the box is provided in its upper edge with two tongues, D, and a middle recess, E, and two side recesses, F, the middle recess being adapted to receive a tongue, G, on the middle of the end of the lid C, and the side recesses, F, being adapted to receive side tongues, H, on the end of the lid C. The middle tongue, G, is provided in its upper surface with a finger-recess, J. A flat spring, K, or a spring of any other suitable construction, is fastened on the bottom of the recess E for the purpose of pressing the end of the lid C upward. A bail or U-shaped bar or strip, L, is pivoted to the sides of the box at the end of the same in such a manner that the cross-piece can be swung over the tongued end of the lid when the same is on the box A. Two flat spring-strips, M, project downward from the cross-piece of this bail and pass through staples N on the end of the box. The tongues G and H on the end of the lid have their upper surfaces slightly recessed, so that the inner edge of the cross-piece of the bail can rest against the shoulder thus formed.

To fasten the lid on the box, one end of the lid is passed under the strap or band B, the bail L is pulled outward, and the tongues G and H at the end of the lid are pressed into the recesses E and F in the upper edge of the end of the box. Then the bail L is pushed back again over the tongues G and H, and thus holds the lid on the box. The springs M press the bail L over the end of the box, and the spring K presses against the under side of the tongue G and presses this tongue against the under side of the cross-piece of the bail, thereby preventing loosening of the bail. The bail L and the straps B are to pass into recesses in the end, sides, and lid of the box, so that their surfaces will be flush with the surfaces of the box. Stamps of muslin or paper will be secured on the lid and box to indicate whether the lid has been tampered with or not.

Having thus fully described my invention, I claim as new and desire to secure by Letters Patent—

1. The combination, with the box A and lid C, of the pivoted bail L and the springs M for pressing the same over the end of the top of the lid, substantially as herein shown and described, and for the purpose set forth.

2. The combination, with the box A, provided with tongues D on the upper edge of one end of the box, and the lid C, provided with tongues G and H at one end, of the pivoted bail L, adapted to be swung over these tongues when the lid is on the box, substantially as herein shown and described, and for the purpose set forth.

3. The combination, with the box A, provided with tongues D on the upper edge of one end of the box, and the lid C, provided with tongues G and H at one end, of the spring K in the recess E between the tongues D, and of the pivoted bail L, substantially as herein shown and described, and for the purpose set forth.

4. The combination, with the box A, provided with tongues D on the upper edge of one end of the box, and the lid C, provided with tongues G H, of the band or strap B, the pivoted bail L, the spring K in the recess E between the tongues D, and the springs M, attached to the bail L, and the staples N on the end of the box, substantially as herein shown and described, and for the purpose set forth.

WILLIAM JOHN BAKER.

Witnesses:
JAMES D. MOORE, Jr.,
F. WHITTLESEY.